Patented Jan. 21, 1947

2,414,631

UNITED STATES PATENT OFFICE 2,414,631

PRODUCTION OF THIOPHENE

James H. Boyd, Jr., Hudson Township, Summit County, and Cary R. Wagner, Utica, Ohio, assignors to Phillips Petroleum Company, a corporation of Delaware No Drawing. Application November 10, 1943, Serial No. 509,773

7 Claims. (Cl. 260—329)

The present invention relates to a process for the production of thiophene, and more specifically, to a process for the production of thiophene by thermal decomposition of diethyl tetrasulfide or its equivalent.

It is known that diethyl disulfide, when heated to 496° C., forms thiophene and other products (Faragher, Morrell and Comay, Ind. Eng. Chem., 1928, vol. 20, page 527). The yield of thiophene, however, is too low to make the process feasible industrially.

It is an object of the present invention to provide a process of producing thiophene.

A further object of the invention is to provide a process for producing thiophene from diethyl tetrasulfide.

Another object of the invention is to provide a process for producing thiophene from ethyl mercaptan by conversion of said compound to diethyl tetrasulfide and decomposition of the latter compound, in either one or more steps.

Further objects of the invention, some of which are more specifically referred to hereinafter, will be apparent to those skilled in the art to which the invention pertains.

In accordance with the present invention thiophene is obtained in good yield by passing diethyl tetrasulfide or its equivalent over a catalyst such as aluminum oxide at a temperature within the range of approximately 300° to approximately 500° C. The yields are unexpectedly higher than those obtained by thermal decomposition of diethyl disulfide. Diethyl tetrasulfide is readily obtainable from ethyl mercaptan according to known reactions, hence the process provides a method for the conversion of ethyl mercaptan to thiophene.

Diethyl tetrasulfide, whose empirical formula is $(C_2H_5)_2S_4$, has been obtained by several different reactions. Whether the products obtained by these different reactions are identical or are different forms or modifications of the same compound we have not as yet been able to establish definitely. Diethyl tetrasulfide as obtained by one reaction may have a peroxide structure whereas the product made by another reaction may have another structure. The product which is obtained by one reaction is stable and can be distilled at atmospheric pressure without decomposition whereas that made by other methods is unstable under similar conditions. Our process is adaptable to diethyl tetrasulfide however obtained or its obvious equivalents as described more specifically and completely hereinafter. As used herein and in the claims "diethyl tetrasulfide" is to include all forms of the compound howsoever prepared.

Diethyl tetrasulfide when prepared by the reaction of sulfur monochloride $(S_2Cl_2)$ on ethyl mercaptan in carbon disulfide solution is a golden yellow oil that is volatile with steam and that has a boiling point of approximately 210° to 212° C. at normal atmospheric pressure, 109° C. at a pressure of 26 millimeters of mercury, and 106° to 108° C. at 24 millimeters. Its density $(d^{20}_4)$ is reported to be 1.1616 and its refractive index $(n^{20}_D)$ to be 1.61809. Diethyl tetrasulfide has been prepared according to this method of reacting ethyl mercaptan with sulfur monochloride and was described by Klason (J. prakt. Chem., 1877, series 2, vol. 15, page 214), Levi and Baroni (Atti acad. Lincei, 1929, series 6, vol. 9, page 777; Chem. Abs., 1929, vol. 23, page 4927) and Bezzi (Gazzetta chim. ital., 1935, vol. 65, page 693; Chem. Abs., 1936, vol. 30, page 217). Chakravarti (J. Chem. Soc., 1923, vol. 123, page 996) obtained diethyltetrasulfide by the reaction of sodium ethyl mercaptide in alcohol with a solution of sulfur monochloride in petroleum ether.

Diethyl tetrasulfide has also been prepared by allowing diethyl disulfide to stand for three months with sulfur and ammonia in alcoholic solution (Holmberg, Berichte, 1910, vol. 43, page 222). As thus obtained it was a dark-colored oil which began to decompose when heated under vacuum to above 80° C.

Birch and Stansfield (Ind. Eng. Chem., 1936, vol. 28, page 668) diluted 15.5 grams of ethyl mercaptan with one liter of benzene and shook it for 15 minutes with a solution of sodium plumbite prepared by dissolving 50 grams of lead acetate in 500 cc. of 25% sodium hydroxide solution. An excess (twice the theoretical amount) of finely divided rock sulfur was then added and the whole was shaken for two hours. After standing overnight, the lower aqueous layer together with the lead sulfide was separated and the clear benzene upper layer was distilled with steam to remove unchanged sulfur. The lead sulfide, which still contained considerable quantities of benzene, was treated with steam and the oil which was volatilized with the steam was added to the benzene layer. The benzene layer was then washed with sodium hydroxide to remove traces of mercaptan and was then washed with water and dried over calcium chloride and the benzene was removed by distillation through a long glass column. The yellow residue was then fractionated under reduced pressure and yielded 8.5 grams of diethyl disulfide (B. P. 53° to 54° C. at 28 mm.), 6 grams of diethyl trisulfide (B. P. 63° to 64° C. at 3.5 mm.) and a residue which consisted largely of sulfur. Diethyl tetrasulfide was undoubtedly present in the product but, like that prepared from diethyl sulfide and sulfur by Holmberg, it could not be recovered by distillation.

The formation of diethyl tetrasulfide in the treatment of sulfur-containing petroleum distillates with doctor solution and sulfur has been postulated by a number of investigators. (See, for example, the review by Lowry, Dryer, Wirth III, and Sutherland, Ind. Eng. Chem., 1938, vol. 30, pages 1277-8; also Gruse and Stevens, "Chemical Technology of Petroleum," second edition, 1942, page 311 et seq. and Ellis, "The Chemistry of Petroleum Derivatives," vol. I and II). As far as known, no one has isolated diethyl tetrasulfide directly from the products resulting from treatment of sulfur-containing petroleum products with sodium plumbite solution and sulfur. Although this may not be an industrially feasible source of diethyl disulfide, diethyl tetrasulfide or other sulfur compounds, we do not wish to exclude the use of compounds obtained from this source in the practice of our invention.

According to a specific preferred embodiment of our invention, diethyl tetrasulfide prepared by the reaction of ethyl mercaptan with sulfur monochloride is vaporized and is then passed over a catalyst comprising aluminum oxide at a temperature within the range of approximately 300° to approximately 500° C. The resulting vapors are condensed and thiophene (boiling point 84° C.) is separated from the condensate by fractional distillation. Washing with alkali to remove hydrogen sulfide from the products in conventional manner may be used, if desired.

The process may also be conducted under reduced or increased pressure. For example, the vapors of diethyl tetrasulfide may be diluted with an inert gas such as nitrogen or methane. A convenient method of accomplishing this is to charge a stream of nitrogen gas through a heated container of diethyl tetrasulfide and pass the nitrogen which contains diethyl tetrasulfide over the heated catalyst. By varying the temperature of the diethyl sulfide container, varying proportions of nitrogen and diethyl tetrasulfide in the vapors may be obtained.

In accordance with another embodiment of our invention, diethyl tetrasulfide, which was prepared from ethyl mercaptan, sodium plumbite solution and sulfur and which was not subjected to destructive heating, is charged in liquid phase to a chamber containing aluminum oxide catalyst that is maintained at a temperature within the range of approximately 300° to approximately 500° C. The reaction occurs in the vapor phase and the vapors issuing from the catalyst chamber are quenched with water. The water layer is then separated from the oil layer and the thiophene is recovered from the oil layer by fractional distillation.

The charging of the diethyl tetrasulfide in liquid phase to the catalyst chamber may be effected by atomization, with or without the use of nitrogen or methane or other inert gas, or may be effected by the general method which was used and described by Faragher, Morrell and Comay (Ind. Eng. Chem., 1928, vol. 20, page 527) for the thermal decomposition of diethyl disulfide.

Instead of using diethyl tetrasulfide one may use a suspension of sulfur in diethyl sulfide, ethyl mercaptan, or other compound which will yield diethyl tetrasulfide or only thiophene and hydrogen sulfide at the temperature of the reaction. The sulfur is used in an amount at least equivalent to that required stoichiometrically to form diethyl tetrasulfide or only thiophene and hydrogen sulfide in accordance with the equations hereinafter.

In another embodiment of our invention, which embodiment is particularly applicable for use in a process in which sulfur and ethyl mercaptan or an ethyl sulfide lower than the tetrasulfide is to be charged, a stream of vapors of ethyl mercaptan or an ethyl sulfide at a suitable temperature and a stream of sulfur vapors at approximately 450° C. or higher are charged to a catalyst chamber maintained at a temperature of approximately 450° to approximately 500° C. The vapors issuing from the catalyst chamber are quenched and the thiophene is recovered by fractional distillation of the oil produced.

After separation of the thiophene from the product, the unchanged diethyl tetrasulfide or its equivalent may be recycled to the catalyst chamber, thereby producing an overall yield that is remarkably high since the reaction proceeds when properly controlled without substantial formation of by-products other than hydrogen sulfide.

The temperature range in which the desired reaction occurs is within the range of approximately 300° to approximately 500° C. but the optimum temperature will vary somewhat depending upon the contact time, the reactants and other reaction conditions which are adopted.

Although the process of the invention is particularly adaptable to the production of thiophene from diethyl tetrasulfide or its equivalents, it may be used for the production of alkyl-substituted thiophenes, for example, 3,4-dimethylthiophene, from dipropyl tetrasulfide or isomers and homologues thereof or their equivalents. The equivalents of the tetrasulfides, as hereinbefore stated, are lower ethyl sulfides and ethyl mercaptan together with sulfur in an amount sufficient to form diethyl tetrasulfide or only thiophene and hydrogen sulfide according to the general series of reactions:

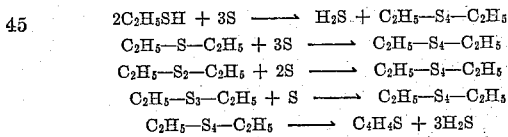

The sulfur compounds used as feed material for the process of the present invention may be considered alkyl derivatives of hydrogen sulfide. These compounds may be represented by the general formula:

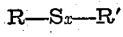

where R is an alkyl group having at least two carbon atoms, $x$ is an integer from one to four, and R' is a member of the class consisting of hydrogen and an alkyl group having at least two carbon atoms.

Excess sulfur may be present with the diethyl tetrasulfide or with any of the foregoing lower sulfides and mercaptans.

The hydrogen sulfide which is generated in the process of producing thiophene may be used for the preparation of mercaptans in conventional manner.

Aluminum oxide has been disclosed as a suitable catalyst. The aluminum oxide may be in the form of bauxite, gibbsite, diaspore or other natural or synthetic aluminum oxide. However, the process may be conducted in the absence of a catalyst (but the yields may be much lower and the reaction temperature much higher) and it may be conducted in the presence of other catalysts such as zinc sulfide, cadmium sulfide, and metal oxides and sulfides of the elements of group VI—A of the periodic system, particularly chromium and molybdenum. These catalysts may be used alone or in combination with each other, or in combination with inert or catalytically active supporting materials.

Inasmuch as the foregoing description comprises preferred embodiments of the invention it is to be understood that the invention is not limited thereto and that modifications may be made therein without departing substantially from the invention as defined in the appended claims.

We claim:

1. A process for the production of thiophene which comprises the heating of diethyl tetrasulfide in the presence of aluminum oxide at a temperature within the range of approximately 300° to approximately 500° C.

2. A process for the production of thiophene which comprises passing a diethyl tetrasulfide in the vapor phase into contact with a catalyst comprising aluminum oxide at a temperature within the range of approximately 300° to approximately 500° C.

3. A process for the production of thiophene which comprises passing diethyl tetrasulfide in the vapor phase into contact with a catalyst comprising aluminum oxide at a temperature within the range of approximately 300° to approximately 500° C., separating thiophene and unchanged diethyl tetrasulfide from the reaction products and recycling the unchanged diethyl tetrasulfide into contact with the catalyst.

4. A process for the production of thiophene which comprises charging to a catalyst chamber containing a catalyst comprising aluminum oxide that is maintained at a temperature within the range of approximately 300° to approximately 500° C. a heated steam of vapors comprising diethyl disulfide and a heated stream of sulfur vapors, the two streams being charged at such rates that the proportions of diethyl disulfide and sulfur present in the catalyst reaction zone are substantially equivalent to those required stoichiometrically for the formation of diethyl tetrasulfide, and recovering thiophene from the reaction products.

5. A process for the production of thiophene which comprises heating diethyl tetrasulfide to a temperature within the range of approximately 300° to approximately 500° C.

6. A process for the production of thiophene which comprises heating to a temperature within the range of approximately 300° to approximately 500° C. an ethyl sulfide together with sufficient elemental sulfur to provide at least two atoms of sulfur for each ethyl group.

7. A process for the production of a thiophene which comprises heating to a temperature within the range of 300 to 500° C. material selected from the group consisting of alkyl sulfides and alkyl mercaptans containing at least two carbon atoms in the alkyl group, together with sufficient sulfur to provide at least two atoms of sulfur for each alkyl group.

JAMES H. BOYD, Jr.
CARY R. WAGNER.

Certificate of Correction

Patent No. 2,414,631.  January 21, 1947.

JAMES H. BOYD, JR. ET AL.

It is hereby certified that error appears in the printed specification of the above numbered patent requiring correction as follows: Column 6, line 6, claim 4, for "steam" read *stream*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.*